Dec. 26, 1950   J. C. WILCOX   2,535,338
FLEXIBLE COUPLING
Filed March 23, 1945   2 Sheets-Sheet 1
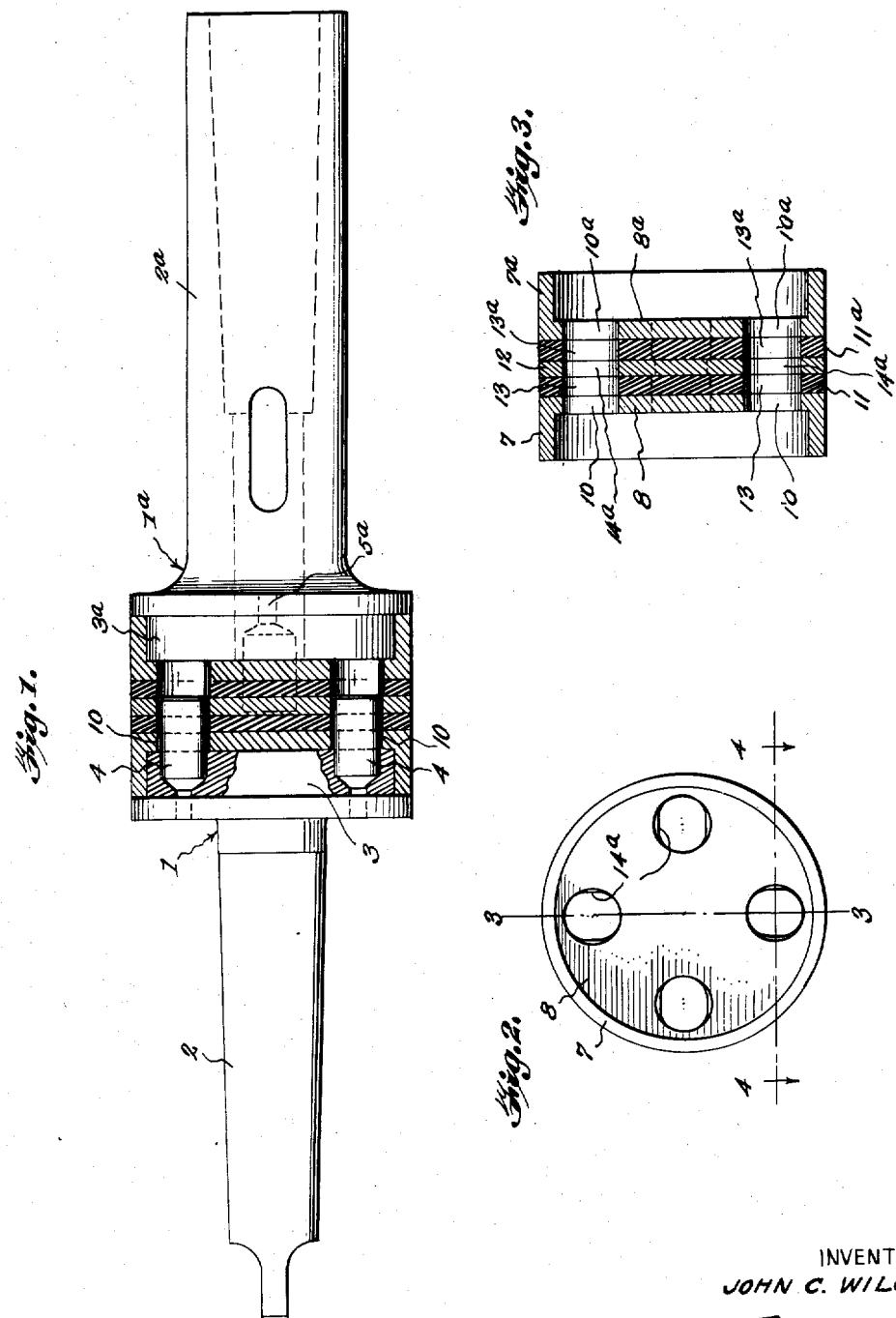
INVENTOR
JOHN C. WILCOX
BY
ATTORNEY Dec. 26, 1950     J. C. WILCOX     2,535,338
FLEXIBLE COUPLING
Filed March 23, 1945     2 Sheets-Sheet 2
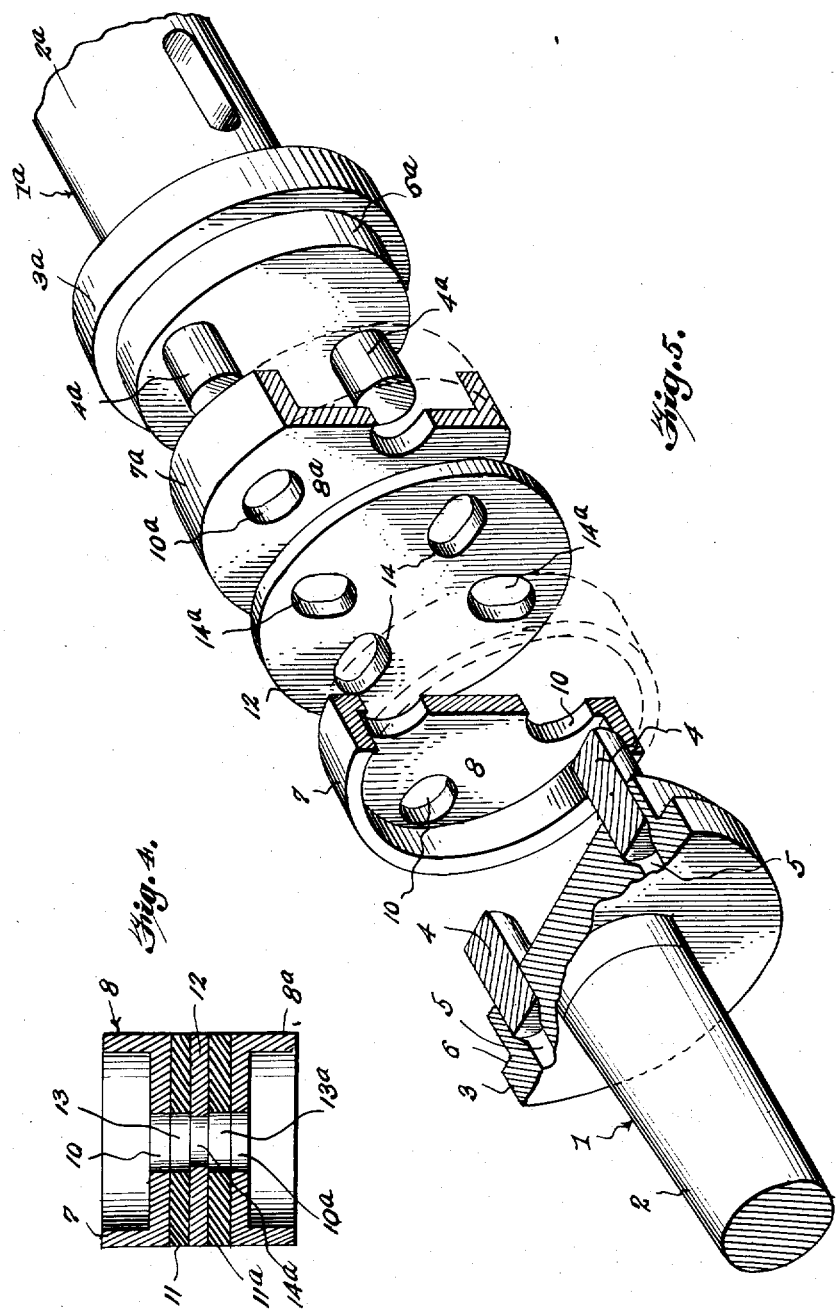
INVENTOR
JOHN C. WILCOX
ATTORNEY Patented Dec. 26, 1950

2,535,338

UNITED STATES PATENT OFFICE 2,535,338

FLEXIBLE COUPLING

John C. Wilcox, Erie, Pa.

Application March 23, 1945, Serial No. 584,374

3 Claims. (Cl. 64—31)

The present invention relates to improvements in flexible couplings usable in conjunction with power shafts and more particularly with tool and tool holders or chucks where the parts constitute in the main a driving and a driven element subject to the torsional effects accompanying the rotation of the parts.

The construction hereinafter described is such that it will transmit torsional moments without breaking strain from one part of the shaft or tool to the other and at the same time permit considerable deviations from precise coaxial alignment of the driving and driven elements. For example, the driving and driven elements may assume relative positions of radial or angular displacement which will be satisfied by an apparent floating of the coupling without sacrificing power, or causing undue wear of the parts.

While the several parts constituting the coupling are arranged to be permanently connected, provision is made for slight axial movement and relatively large radial movement of the driving and driven elements under the forces of tension and compression. Provision is also made for controlling the amount of radial movement.

The invention is particularly adaptable to machine tool work where it will act as an aligning medium between the cutting tool and the operating means therefor, rendering it possible to drill, bore or ream straight holes irrespective of whether the operating means and tool are relatively misaligned radially or angularly, or both.

In general the invention comprehends a driving and a driven element each provided with keys or pins with an interposed power transmitting member provided with suitable openings to receive the keys or pins of the driving and driven elements. The driving and driven elements and the interposed member are connected together to form a unit by flexible bodies fashioned of a material known to the trade as neoprene, a compound of chloroprene base synthetic rubber, or an equivalent material that is equally resistant to oil and grease. The flexible bodies are bonded or vulcanized to the elements and the power transmitting member and are provided with openings to permit the passage of the pins or keys therethrough for engagement with the power transmitting member as heretofore explained.

While in the detailed description to follow and in the drawings reference is made to the flexible connection or coupling as embodied in a tool holder, it will be apparent to those skilled in the art that the structure and functions involved are equally adaptable for other uses, for instance in shafting or power lines where misalignment of parts may be a factor requiring compensation or correction, without departing from the spirit of the invention.

Referring now to the drawings in which corresponding parts are designated by corresponding marks of reference:

Figure 1 is a side elevation, partly in section, illustrating the invention.

Figure 2 is an end view of the cap and power transmitting member showing their normal assembled relation.

Figure 3 is a section showing the union of the caps, power transmitting member and flexible bodies on the line 3—3 of Figure 2.

Figure 4 is a similar section on the line 4—4 of Figure 2.

Figure 5 is an exploded view of several parts of the invention, with the flexible bodies omitted for better illustration.

In the tool holder herein described as showing an embodiment of the invention a driving element 1 and driven element 1a are substantially identical in construction and include shanks 2, 2a with heads 3, 3a at adjacent ends of the elements. The free end of the shank 2 is shaped for insertion in the power machine and the corresponding end of the shank 2a may be recessed or otherwise formed to receive the boring or cutting tool. Each head is provided with suitable openings in which are pressed or otherwise secured the driving and driven pins or keys 4 and 4a, respectively. The keys of each element are diametrically opposed and by preference are equally spaced from the axis of the tool holder. In the assembled coupling the driving pins and the driven pins are disposed angularly 90° as shown in Figure 5. Openings 5, 5a in the heads behind the pins may be used in aid of removal of the pins. The adjacent ends of the heads are reduced in diameter to provide the annular recesses 6, 6a for the reception of the flanges 7, 7a of caps 8, 8a. These caps are provided with openings 10, 10a through which the pins of the corresponding heads extend and of slightly greater diameter than the pins as shown in Figure 1.

Flexible bodies 11 and 11a preferably formed of a material known to the trade as neoprene, as hereinbefore described, are bonded or vulcanized to the inward radial faces of the caps 8 and 8a. The opposite surfaces of the flexible bodies are in turn bonded or vulcanized to the opposite faces of a centrally positioned power transmitting member 12. The resilient bonding material is extremely stiff in the axial direction but provides free movement in all radial directions. Enough axial compression is provided, however, to compensate for angular misalignment between the tool and its operating means, and the free radial movement compensates for a large degree of parallel misalignment between the tool and its operating means. The flexible bodies 11 and 11a are provided with openings 13 and 13a through which the keys 4 and 4a freely extend. The perimeters of these bodies may be exposed or unconfined so as to permit them to expand or contract readily as the case may be when the holder is operating under misaligned conditions.

The length of the driving and driven keys is such that they extend from opposite sides into but not materially beyond openings 14 and 14a formed in the member 12. As shown in Figure 5, the openings 14 are diametrically opposed and the openings 14a similarly opposed but at right angles to the openings 14. The keys engage the radial sides of the openings in a sliding fit and as shown in Figure 2 the openings are elongated so as to permit relative radial movement between the keys and member. The sides of the keys which engage the member circumferentially may be flattened to work against the sides of the openings or the keys and openings may be otherwise shaped so long as the compounding of the radial movement of the keys and action of the flexible bodies is carried out. Each opening 14 and 14a is radially and equally elongated and in such a manner that when the driven and driving elements are axially aligned each of the keys 4 and 4a occupies a position at the center or approximate center of the openings 14 and 14a. This arrangement permits a rotation of the tool holder in any direction with equal facility. This relation of the keys and openings in the power transmitting member is desirable in that a neutral or true axial relation of the parts is obtained. The engagement of the keys in the elongated openings of the power transmitting member 12 controls and limits the wind-up or twisting of the bonding material when power is applied through the holder. Under these conditions uniform and sufficient but controlled latitude is provided for the flexing of the unit under abnormal factors of working as would be occasioned by misalignment between the tool and its operating means.

From the foregoing description it will become apparent that in cases of misalignment the several parts will allow for a radial or angular float in any or all directions at the same time, thus compensating for or negativing the effects of such misalignment.

It has been found convenient in manufacturing or assembling the flexible coupling to bond or vulcanize the elastic bodies 11 and 11a to the caps 8 and 8a and the member 12 to form a unit as shown in Figures 3 and 4, after which the driving and driven members are pressed into the caps with the pins of the driving and driven members passing through the openings in the caps and engaging the radial sides of the elongated openings in the power transmitting member 12.

The use of an elastic bonding material provides another important operating advantage that cannot be secured with any strictly mechanical connection for correcting misalignment. The elastic bonding material dampens and absorbs the shocks and vibrations that are inherent in a power machine when it is in motion and also the vibrations of a tool under the thrust of cutting.

By fashioning the heads, caps, flexible bodies and power transmitting member to equal diameters, a smooth outer surface of the coupling will be had, thus avoiding injury to the operator and offering no crevices or pockets for the reception of dirt or refuse. The material herein suggested for the flexible bodies is resistant to oil and grease and consequently will remain unaffected thereby over long periods of use.

What is claimed is:

1. In a flexible coupling, the combination of driving and driven elements, each comprising a shank and an enlarged head at one end thereof, diametrically opposed keys carried by each head and projecting longitudinally therefrom, the keys of one head being angularly displaced substantially ninety degrees with respect to the keys of the other head, a cap affixed to each head and through which the keys pass, a member interposed between the driving and driven elements provided with a plurality of radially elongated openings angularly disposed to receive the keys of each of said elements, and a flexible body bonded to each cap and said member whereby said elements are connected as a unit operable to compensate for relative misalignment affecting the driving and driven elements.

2. In a flexible coupling, the combination of a driving element, a driven element, each of said elements being provided with a radial face, longitudinal keys associated with said elements, a rigid member intermediate the driving and driven elements provided with radial faces, and flexible material bonded to the radial faces of said elements and said member, said member being provided with openings radially elongated into which said keys extend with a close fit in the arcuate path of rotation but with capacity for free sliding movement radially.

3. In a flexible coupling, the combination of driving and driven elements, at least one key carried by each element and projecting longitudinally therefrom, the key of one element being angularly displaced substantially ninety degrees with respect to the key of the other element, caps affixed to and snugly receiving the elements and through which the keys pass, a member interposed between the driving and driven elements provided with a plurality of radially elongated openings angularly disposed to receive the keys of said elements, and a flexible body bonded to each cap and said member whereby said elements are connected as a unit operable to compensate for relative misalignment affecting the driving and driven elements.

JOHN C. WILCOX.

REFERENCES CITED

The following references are of record in the file of this patent:

UNITED STATES PATENTS

| Number | Name | Date |
|---|---|---|
| 1,479,755 | Stokes | Jan. 1, 1924 |
| 1,814,836 | Lederman | July 14, 1931 |
| 1,983,094 | Neher | Dec. 4, 1934 |
| 2,101,078 | Lord et al. | Dec. 7, 1937 |